United States Patent
Wang et al.

(10) Patent No.: US 9,489,392 B2
(45) Date of Patent: Nov. 8, 2016

(54) HIGH AVAILABILITY DATA REPLICATION

(71) Applicant: CA, Inc., Islandia, NY (US)

(72) Inventors: Xiaopin Wang, Beijing (CN); Haiyang Zhang, Beijing (CN); Guoxian Shang, Beijing (CN); Shaorong Li, Beijing (CN)

(73) Assignee: CA, Inc., Islandia, NY (US)

( * ) Notice: Subject to any disclaimer, the term of this patent is extended or adjusted under 35 U.S.C. 154(b) by 401 days.

(21) Appl. No.: 14/163,940

(22) Filed: Jan. 24, 2014

(65) Prior Publication Data
US 2015/0213051 A1 Jul. 30, 2015

(51) Int. Cl.
*G06F 17/00* (2006.01)
*G06F 17/30* (2006.01)

(52) U.S. Cl.
CPC .............................. *G06F 17/30174* (2013.01)

(58) Field of Classification Search
CPC .... G06F 21/564; G06F 21/56; G06F 21/566; G06F 21/562; G06F 3/0605; G06F 3/067
See application file for complete search history.

(56) References Cited

U.S. PATENT DOCUMENTS

2014/0195480 A1* 7/2014 Talagala .............. G06F 12/0804
707/610

* cited by examiner

*Primary Examiner* — Truong Vo
(74) *Attorney, Agent, or Firm* — Gilliam IP PLLC

(57) ABSTRACT

A data replication system and method is disclosed in which a master file server uses a first filter in a kernel space to intercept file I/O events, send the file I/O events over a first network, for example a local area network, to a second filter in a kernel space of a first replica file server, and submit the file I/O event to a file system program in user space of the master file server to be processed. The second filter records the file I/O event in a memory of the second file server and sends an acknowledge message to the first filter indicating the file I/O event received by the second filter has been recorded in the replica file server. The first filter notifies user land in the first file server that the file I/O event has been processed if the first filter has received the acknowledge message and the file system program has completed processing the file I/O event in the first file server. In one embodiment, a data replication engine in the first replica file server replicates data stored in the first replica file server to a second replica file server in a location remote from the second replica file server, using a second network, for example a wide area network.

17 Claims, 7 Drawing Sheets

HIGH AVAILABILITY DATA REPLICATION

BACKGROUND

This application relates generally to data storage, and more specifically to systems and methods for high availability data replication.

BRIEF SUMMARY

A system and method are described that include a first computing system and a second computing system. The first computing system includes a first operating system, at least one first memory, and a first data storage device. The first operating system maintains in the at least one first memory a first kernel space to support a first kernel land and a first user space to support a first user land. The first user land is used to execute a first file system program, where the first file system program receives a first file I/O event and processes the first file I/O event to record data in the first data storage device.

The second computing system includes a second operating system, at least one second memory, and a second data storage device. The second operating system maintains in the at least one second memory a second kernel space to support a second kernel land and a second user space to support a second user land. The second user land is used to execute a second file system program, where the second file system program receives the first file I/O event and processes the first file I/O event to store data in the second data storage device.

The system and method also include a first filter in the first kernel space and a second filter in the second kernel space. The first filter includes first computer program instructions to execute on the first computing system, where the first computer program instructions receive the first file I/O event, send the first file I/O event to the second filter, send the first file I/O event to the first file system program, and listen for an acknowledge message from the second filter that the recording of the first file I/O event has been completed by the second file system program. The first computer program instructions also include instructions to notify the first user land that the I/O event has been processed if the I/O event has been successfully processed by the first file system program and the acknowledge message has been received by the first filter.

The second filter includes second computer program instructions to execute on the second computing system, where the second computer program instructions listen for the first file I/O event sent by the first filter, record the first I/O event in the second memory, and send the acknowledge message to the first filter after the recording of the file I/O event has been completed by second file system. The second filter also includes at least one socket in the second kernel land to listen for communications from the first filter.

The system and method also include a thread in the second kernel space, where the thread includes computer program instructions to move the first file I/O event from the second memory to the second file system program to be processed.

BRIEF DESCRIPTION OF THE DRAWINGS

Aspects of the present disclosure are illustrated by way of example and are not limited by the accompanying figures with like references indicating like elements.

DETAILED DESCRIPTION

Illustrated in the various figures, and described herein below, there are provided systems and methods for continuous data protection, high availability (HA) data replication. Continuous data protection (CDP), also called continuous backup or real-time backup, refers to backup of computer data by automatically saving a copy of every change made to that data, essentially capturing every version of the data that the user saves. It allows the user or administrator to restore data to any point in time. According to one example embodiment, there is provided a CDP system that runs as a service that captures changes to data to a separate storage location.

Figure 1A:
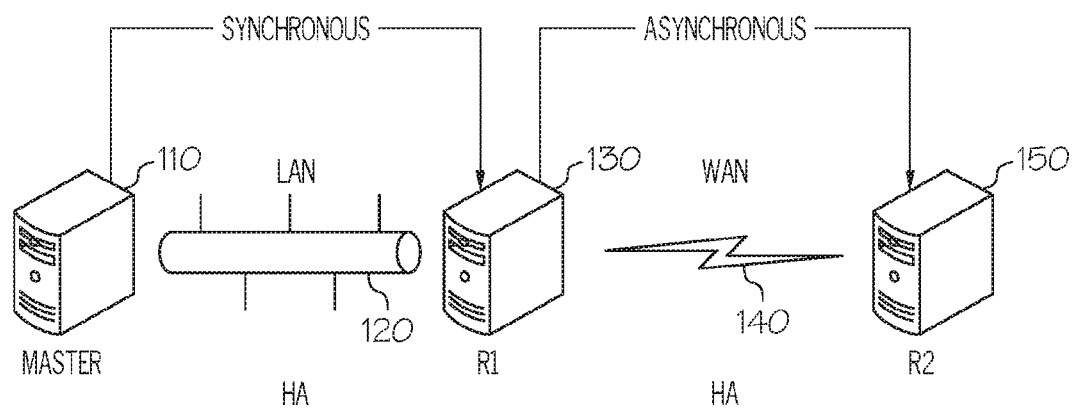
FIG. 1A is a simplified diagram illustrating an overview of an example embodiment of a data replication system.

Referring now to FIG. 1A, there is illustrated a diagrammatic illustration of a CDP data replication system according to one example embodiment. In this embodiment, data from a master file server 110 is synchronized to a second replica file server (R2) 150, through a first file server (R1) 130. The first replica file server 130 is synchronized with the master file server 110 over a first high bandwidth connection, such as, but not limited to, a local area network (LAN) 120, and the second replica file server 150 is in turn synchronized with the first replica file server 130, over a second connection, such as, but not limited to, a wide area network (WAN) 140. In one example embodiment, LAN 120 has a bandwidth that is higher than the WAN 140. In one example embodiment, the LAN 120 may be a gigabyte LAN, or one of higher, or lower speed. It is understood, however, that while LAN 120 may have higher bandwidth capacity than WAN 140, it may at times transfer information more slowly than WAN 140 under certain loading conditions.

In example embodiments described herein, the term file server means a computer, typically attached to a network, that has the primary purpose of providing a location for shared disk access, i.e. shared storage of computer files (such as documents, sound files, photographs, movies, images, databases, etc.) that can be accessed by the workstations, computers, or other client devices that are attached to the same computer network. A file server is not intended to perform computational tasks, although it is capable of it and may, and does not normally run computer programs on behalf of its clients, although it may. It is designed primarily to enable the storage and retrieval of data, while the computation is carried out by other computers or devices on the network.

Figure 1B:
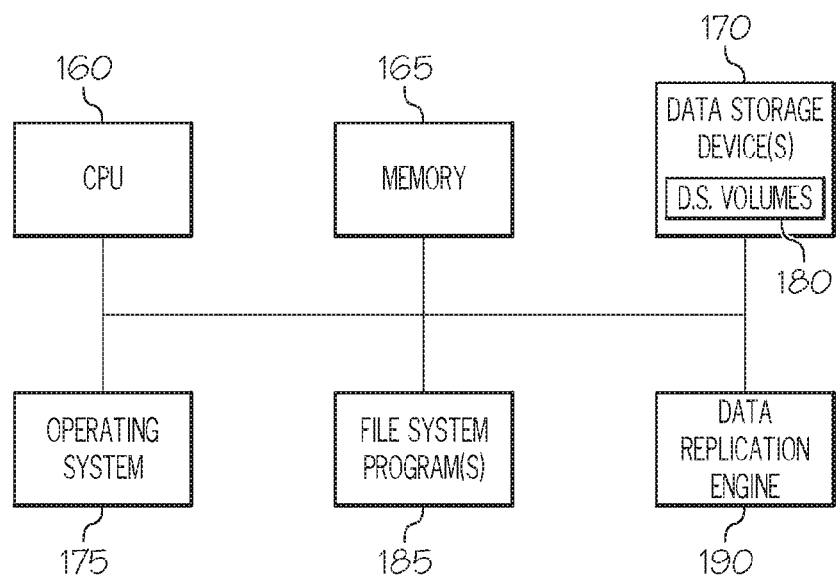
FIG. 1B is a simplified diagram illustrating an overview of salient components of a file server according to an example embodiment.

As illustrated in FIG. 1B, each of master file server 110, first replica file server 130, and second replica file server 150, all include computing systems including one or more central processing units (CPUs) 160, memory 165, and data storage device(s) 170. Data storage devices 170, according to one example embodiment, include storage media such as magnetic, optical or solid state storage, wherein, in one example embodiment, data is stored in storage volumes 180 in the storage media. Each of the computing systems also includes an operating system 175, respectively, and file system programs 185 that execute in the CPU(s) 160, to carry out file storage and retrieval operations in data storage devices 170.

In one embodiment, first replica file server 130 and second replica file server 150 each also include a data replication engine 190, in the form of at least one computer program stored in the respective data storage devices 170. Data replication engines 190 work in conjunction with one another to replicate data asynchronously between server 130 and server 150, over WAN 140.

Figure 2:
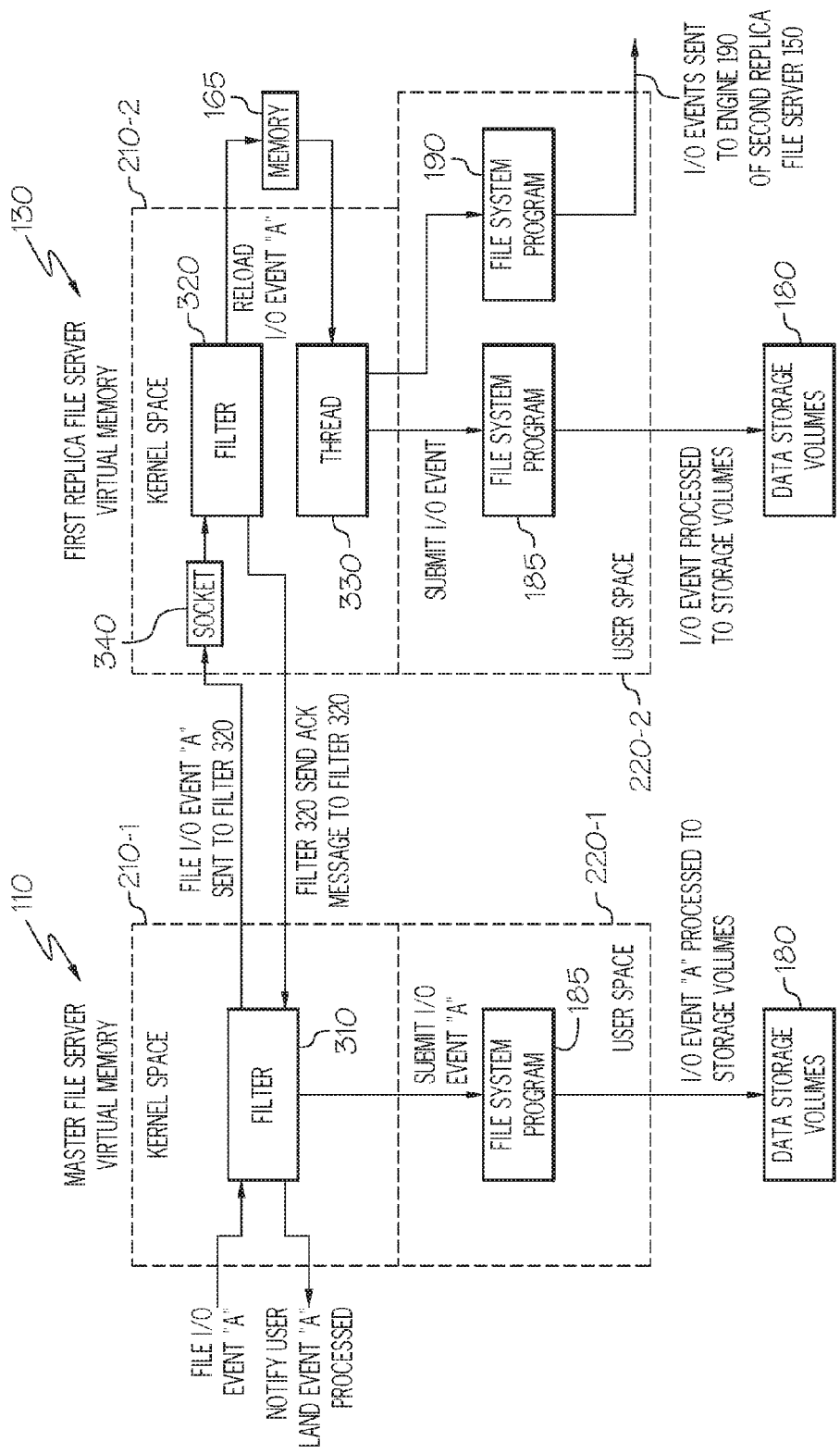
FIGS. 2, 3, 4 and 5 illustrate data replication and back up systems, methods and computer programs according to an example embodiment.

As illustrated in FIG. 2, operating system 175, maintains a virtual memory 200, maintained in memory 165 and optionally data storage devices 170, to support operation of file servers 110, 130 and 150. According to one example embodiment, virtual memory 200 is segregated into kernel space 210 and user space 220. In one example embodiment, kernel space 210 is strictly reserved by the respective operating systems 175 for running privileged kernel, kernel extensions, and most device drivers. In contrast, according to an example embodiment, user space 220 is the memory area where all user mode applications and some drivers execute. Similarly, the term user land refers to all application software and processes that run in user space 220, and kernel land refers to all kernel, kernel extensions and device drivers and processes that run in kernel space 210. User land further refers to the various programs and libraries that the operating system uses to interact with the kernel: software that performs input/output, manipulates storage system objects, etc. According to one embodiment, file system programs 185 operate in user land in order to carry out file storage and retrieval operations in data storage devices 170.

Figure 3:
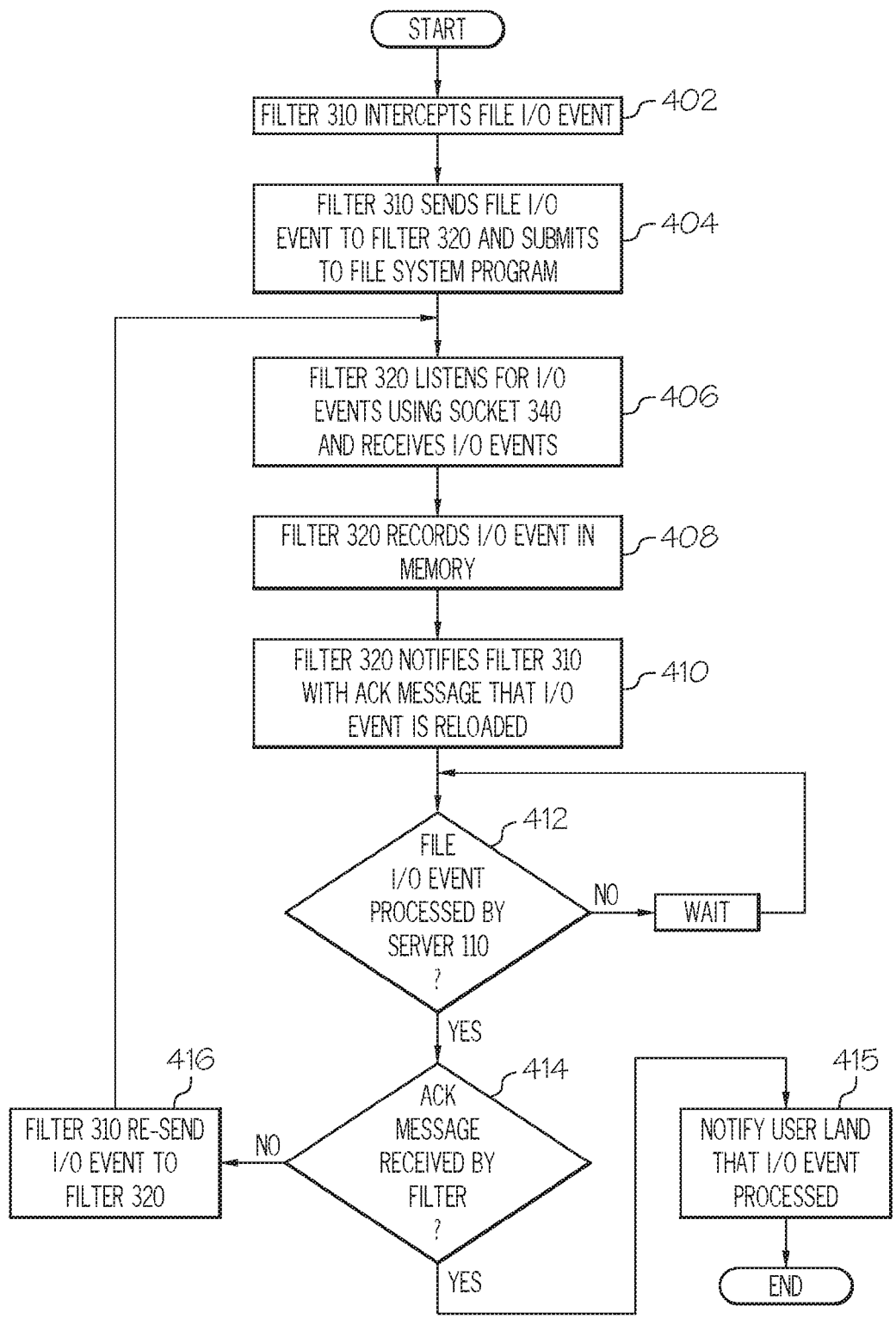
Figure 4:
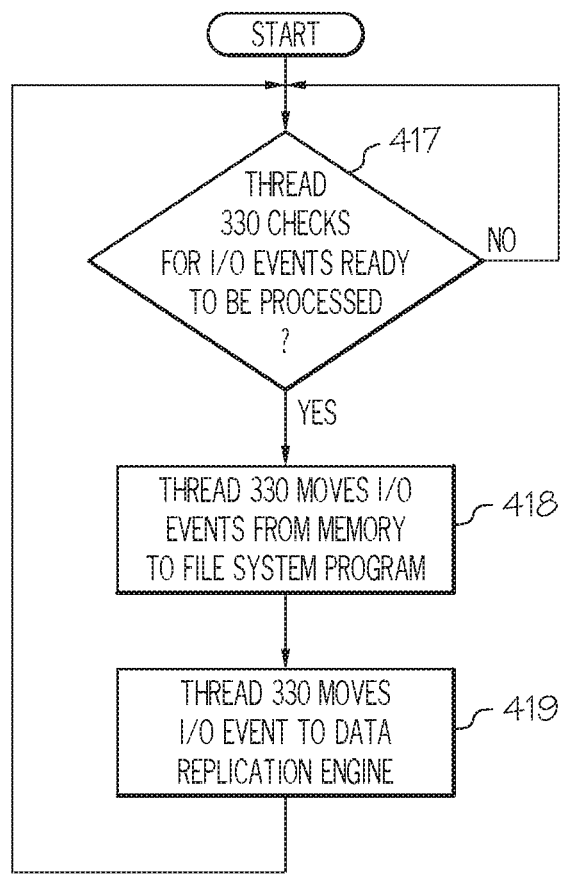

As illustrated in FIGS. 3 and 4 there is shown a diagrammatic representation of a process, according to one example embodiment, for writing data to the master file server 110, replicating it to the first replica file server 130, and optionally, in one example embodiment, replicating the first replica file server 130 to a second replica file server 150. To replicate from the master file server 110 to the first replica file server 130, synchronous continuous data protection (CDP) is provided in kernel land (hash shaded functions), and in the replication from file server 130 to second replica file server 150, asynchronous replication is used, to achieve a low cost solution with no data loss failover on a high bandwidth network between the master file server 110 and the first replica file server 130.

As will be explained in greater detail further below with respect to one example implementation embodiment, a filter 310 in the kernel space 210-1 of the master file server 110 communicates with a filter 320 in the kernel space 210-2 of the first replica file server 130, to ensure a file I/O event directed to the master file server 110 is recorded in the first replica file server 130, before the master file server 110 notifies user land that the file I/O event has been successfully processed. According to one example embodiment, a file I/O event "A" is intercepted and captured by filter 310, sent to filter 320, and submitted to file system program 185 in user space 220-1 for processing, for example recording, in data storage device(s) 170. In one embodiment, the file I/O event is first sent to filter 320 before being submitted to the file system program 185 of master file server 110, but these two tasks may be performed in any order or simultaneously. In one embodiment, the file I/O event A may be performed directly into the storage volumes 180 of data storage devices 170, or first buffered in a memory 165 of server 110, and retrieved from there for processing in the storage volumes 180.

Filter 320 receives the file I/O event A sent by filter 310, records it in memory 165 of first replica file server 130, and then sends an acknowledge (ACK) message to filter 310, indicating that it has recorded the file I/O event A. A thread 330 in kernel space 210-2 takes the I/O event A stored in the memory 165, and submits it to file system program 185 in user space 220-2, which in turn processes the I/O event in the storage volumes 180 of data storage device(s) 170. In one embodiment, the ACK message is sent before the thread 330 takes any action to submit the file I/O event to the file system program 185, although it may do so after thread 330 initiates moving the I/O event A from the memory to file system program 185.

After file system program 185 in the master file server 110 completes the processing of I/O event A in the storage volumes 180, filter 310 notifies user land that the I/O event A has been processed, provided that, and only if, an ACK message has been received from filter 320 indicating that the I/O event A was successfully recorded in server 130. As indicated above, the ACK message is sent to filter 310 as soon as the file I/O event is stored in memory 165, so that the ACK message does not have to wait until the file I/O event is moved from memory 165 to the data storage volumes 180. Further, the ACK message may be received before or after the file I/O event A has been recorded in the storage volumes 180 of storage device(s) 170.

As shown in more detail in the flow chart 400 of FIG. 4, the master file server filter 310 captures (402) file I/O directed to the master file server 110. Before passing the I/O events to the file system program 185 in server 110, it sends (404) the events, in event form, to the file server filter 320 for replica file server 130. In another example embodiment, filter 310 passes the I/O events to the file system program 185 before it sends the I/O events to filter 320.

Filter 320 listens (406) to the file I/O using a socket 340 in kernel land. Filter 320, after receipt of a file I/O event, records (408) the file I/O event in memory 165, and responds (410) immediately to the master file server 110 with an ACK message signifying that the file I/O event is recorded in the replica file server 130. If the respective file I/O event has been successfully processed (412) by file system program 185 in master file server 110, and the ACK message has been received (414) by filter 310 for a particular file I/O event, filter 310 notifies (415) user land of the successful completion of the file I/O event processing. In case of a failure (416) of filter 310 to receive an ACK message, filter 310 resends the I/O event to the first replica file server 130 until it succeeds in receiving the ACK message. One advantage for the replica file server 130 to listen for and accept file I/O events in kernel land is speed, or in other words, less user/kernel mode switches.

Figure 5:
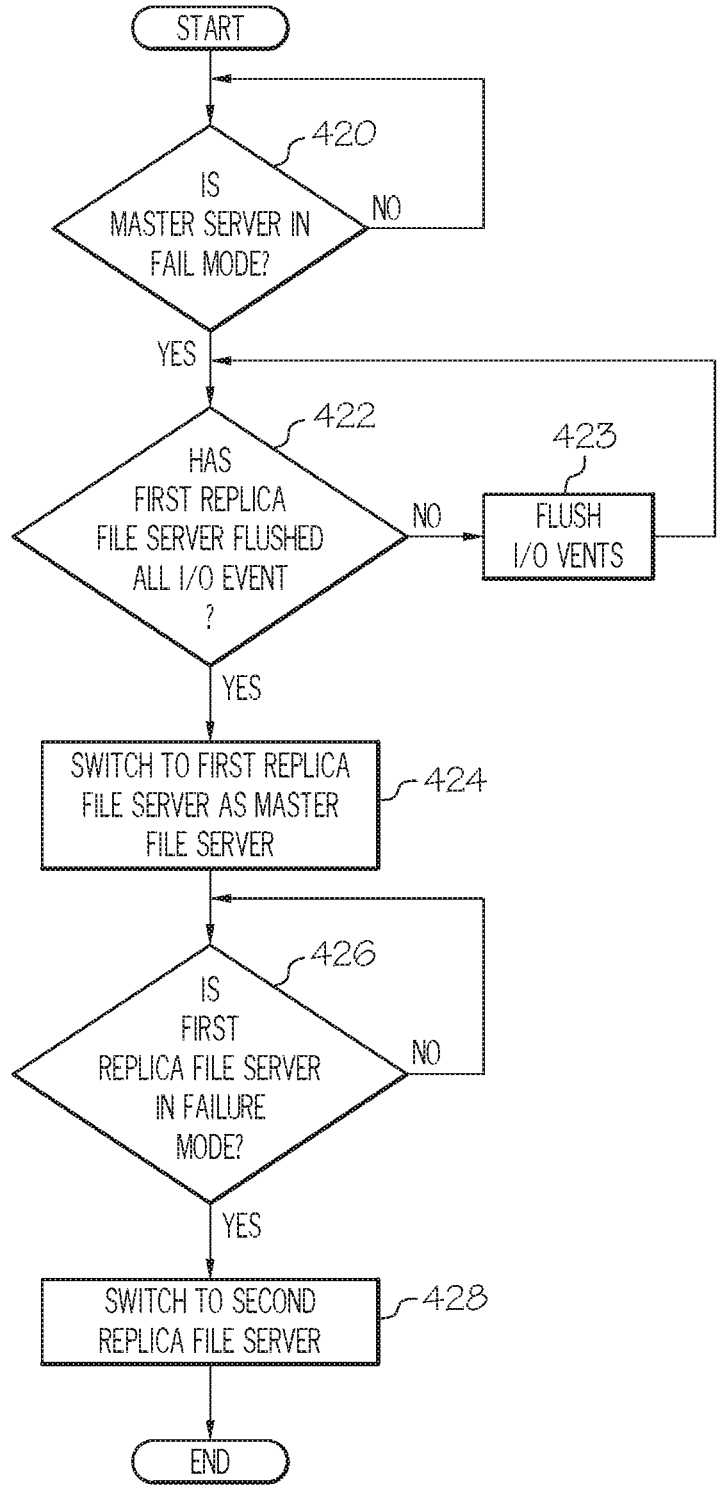

Further, as illustrated in FIG. 5, replica file server 130 has a computer program thread 330 in kernel land to monitor (417) I/O events saved in memory 165 and retrieve the file I/O events stored in memory 165 and submit (418) the I/O events to the file system program 185. Thread 330 may run independently of the other processing described in FIG. 4. File system program 185 in turn processes the file I/O events in server 130, for example writing or deleting data in accordance therewith to the storage device 170. According to an embodiment, thread 330 also passes (419) the I/O events to a replication engine 190 for the asynchronous replication to the remote second replica file server 150. It shall be understood, however, that the replication of data from first replica file server 130 to second replica file server 150 is optional.

Thus, the embodiment described above, compared to synchronous CDP, does not need to flush the replica file I/O events to storage volumes 180, before the master file I/O event can be passed to the file system program 185, which is a performance hit. During failover, the first replica file server 130 first applies all events left in memory 165 to the storage device 165, and then notifies its replication engine 190 to start services for high availability operation. Since all file I/O events are first recorded in the replica file server 130 before the master file server 110 confirms completion of recording the file I/O event, no data is lost in or during failover.

According to certain example embodiments described above, there are provided assorted advantages and features. According to one embodiment, the above described system can be deployed so as to provide replication with no risk of data loss and with negligible performance impact provided that the local area network 120 (such as but not limited to a LAN) bandwidth is sufficiently high, or fast. According to one embodiment, this speed is achieved because the replica file server 130 does not need to flush file I/O events to the storage volumes 180 before the master file server 110 is allowed to complete handling of an I/O event. According to this embodiment, the master I/O event driver only returns to user land after successfully completing processing of the I/O event. Further, according to one embodiment, the synchronization mechanism works as it would in replication systems that do not employ the data replication filters herein described, and, in addition, the asynchronous HA replication over the WAN 140 may be performed, in one example embodiment, using a conventional process.

Figure 6:
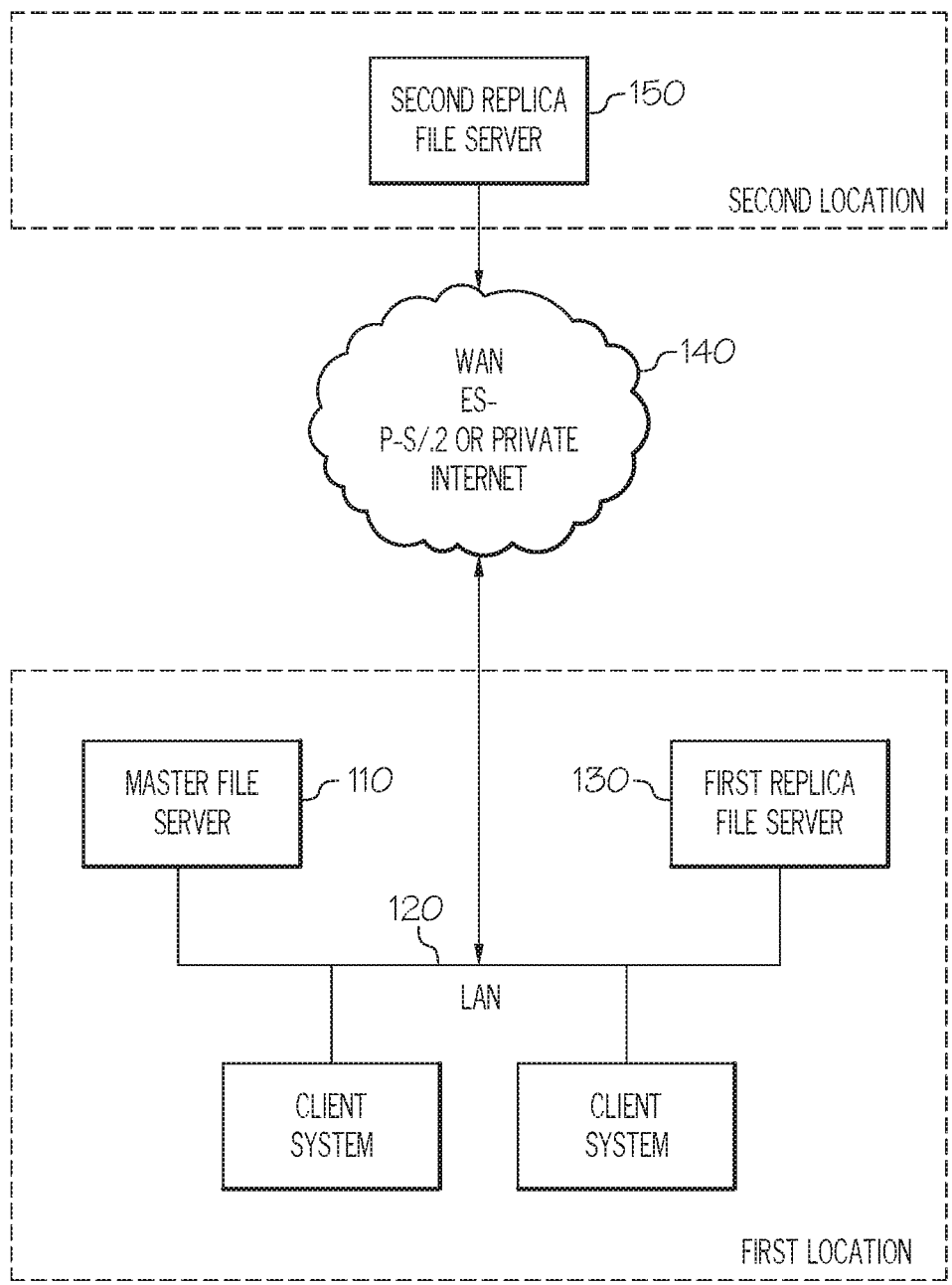
FIG. 6 is a block diagram illustrating an example embodiment of a data replication and back up architecture.

As illustrated in FIG. 6, if (420) the master file server 110 is down or in fail mode, first replica file server 130 takes over (424) as the new master file server, if (422) first replica file server 130 has flushed all I/O events from memory to its storage volumes. If not, the remaining I/O events are flushed (423) to the storage volumes 180. Further, if (426) both the master file server 110 and first replica file server 130 are down, the second replica file server 150 takes over (428) as the master file server. Thus, a combination of synchronous and asynchronous continuous data protection (CDP) is provided in kernel land to achieve a low cost solution with no data loss failover on a high bandwidth network.

Example Platform Architecture

Figure 7:
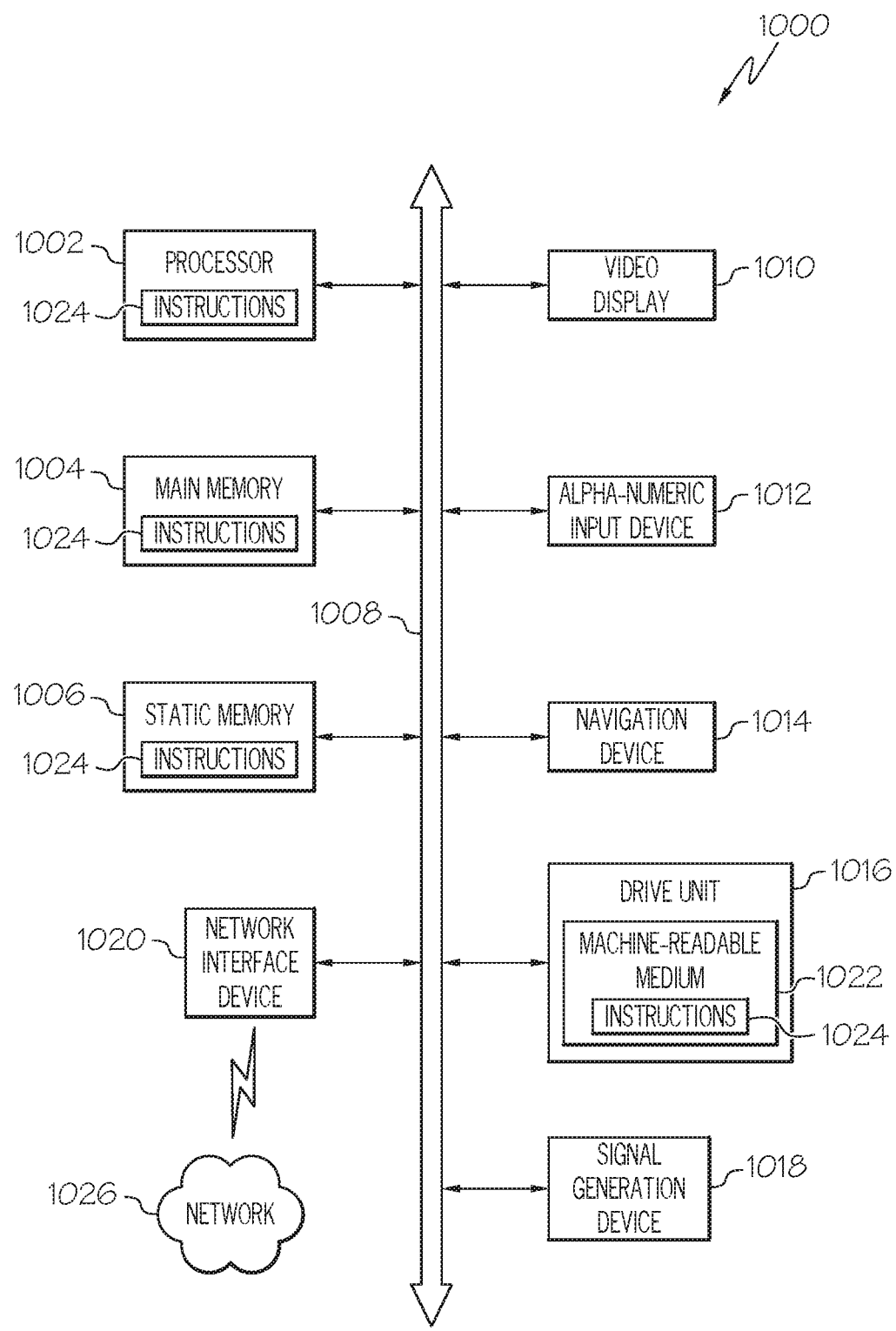
FIG. 7 is a diagrammatic representation of a machine in the example form of a computer system within which a set of instructions for causing the machine to perform any one or more of the methodologies discussed herein may be executed.

FIG. 7 is a block diagram illustrating a network-based system 700 for deploying and/or implementing the various embodiments described herein. In one embodiment the system 700 operates in real time or near real-time. In one embodiment, the system 700 is deployed in whole or in part in one or more data centers. Master file server 110 and first replica file server 130 are, in one embodiment, co-located in physical proximity to one another at a first location, for example in a data center, and are connected via a LAN 120 to one or more clients 710, 712. In an example, the client machines 710 and 712 can be in the form of application servers, workstations, personal computers, laptops, or mobile devices. The second replica file server 150, in one embodiment, is located at a second location geographically remote from file servers 110 and 130, and is connected to file servers 110 and 130, and one or more clients 710 and 712, over a WAN 140.

Further, while the system 700 shown in FIG. 7 employs a client-server architecture, the embodiments herein are of course not limited to such an architecture, and could equally well find application in a distributed, or peer-to-peer, architecture system, for example.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Machine Architecture and Machine-Readable Medium

FIG. 8 is a block diagram of a machine in the example form of a computer system 1000 within which computer program instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer system, a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for computer guided have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the terms "a" or "an" are used, as is common in patent documents, to include one or more than one, independent of any other instances or usages of "at least one" or "one or more," unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A data replication method, comprising:
intercepting a file I/O in a first kernel space of a first file server before submitting the file I/O to a first file system program operating in a first user space of the first file server;
sending, from the first kernel space, the file I/O as a file I/O event to a second kernel space of a second file server;
submitting, the file I/O to the first file system program without waiting for an acknowledge message from the second file server;
receiving the acknowledge message from the second file server, the acknowledge message indicating the file I/O event has been recorded at the second file server; and
notifying an application or process in the first user space that the file I/O has been successfully processed, upon the condition that the acknowledge message is received by the first file server and the first file system program has completed processing the file I/O.

2. A method according to claim 1 further comprising the second kernel recording the file I/O event received from the first kernel into a memory of the second file server and communicating the acknowledge message back to the first file server.

3. A method according to claim 2, further comprising:
submitting, in a thread program in the second file server kernel space, the file I/O event recorded in the second file server memory to a second file system program at the second file server; and
committing the file I/O event to a storage device associated with the second file server.

4. The data replication method of claim 1, wherein a first filter in the first kernel space of the first file server intercepts the first file I/O.

5. The data replication method of claim 1, wherein sending comprises sending the file I/O event to a socket of the second file server, wherein the socket is associated with a second filter in the second kernel space of the second file server.

6. The data replication method of claim 1, further comprising resending, from the first kernel space of the first file server, the file I/O event to the second kernel space of the second file server after the first file system program has completed processing the file I/O until the receipt of the acknowledge message.

7. A continuous data protection system, comprising:
a first computing system including a first operating system, a first memory, a first data storage device, wherein the first operating system maintains in the first memory a first kernel space to support a first kernel and a first data protection service that runs in the first kernel space, the data protection service to,
send a first file I/O as a first file I/O event to a second computing system,
submit the first file I/O to a first file system program of a first user space without waiting for an acknowledge message from the second computing system, and
indicate to an application or process in the first user space completion of the first I/O dependent upon receipt of an acknowledge message from the second computing system and the first file system program completing processing of the first file I/O;
the second computing system including a second operating system, a second memory, a second data storage device, wherein the second operating system maintains in the second memory a second kernel space to support a second kernel and a second data protection service that runs in the second kernel space, the second data protection service to, listen for file I/O events on a socket,
record the first file I/O event into the second memory after receipt of the first file I/O event, and
communicate an acknowledge message for the first file I/O event to the first computing system after recording the first file I/O event into the second memory.

8. A continuous data protection system according to claim 7, wherein the second data protection service submits the first file I/O event to a data replication engine on the second computing system to replicate to a third computing system.

9. A continuous data protection system according to claim 7, wherein a first network connects the first and second computing systems, the continuous data protection system further comprising a third computing system connected to the second computing system with a second network, the first network having a higher bandwidth than the second network, the second and third computing systems each including a data protection service to replicate data from the second computing system to the third computing system.

10. A continuous data protection system according to claim 7, wherein in case of failure of the second data protection service to send an acknowledge message, the first data protection service to resend the first file I/O as the first file I/O event to the second data protection service.

11. The continuous data protection system of claim 7, wherein the second computing system comprises a second file system program and the second data protection service to submit the first file I/O event to the second file system program after recording the first file I/O event into the second memory.

12. The continuous data protection system of claim 11, further comprising a thread in the second kernel space of the second file server to submit the file I/O event to the second file system program.

13. The continuous data protection system of claim 7, further comprising a first filter in the first kernel space of the first file server to intercept the first file I/O to allow sending the first file I/O before submission to the first file system program.

14. The continuous data protection system of claim 7, further comprising a second filter in the second kernel space of the second file server to receive the file I/O event sent by the first kernel space of the first file server.

15. One or more non-transitory machine-readable media comprising program code to:

in a first kernel space of a first file server, intercept a file I/O event before submitting the file I/O event to a first file system program operating in a first user space of the first file server;

send the file I/O event to a second file server, submit the file I/O event to the first file system program; and notify an application or process in the first user space in the first file server that the file I/O event has been successfully processed if an acknowledge message for the file I/O event is received from the second file server and the first file system program has completed processing the file I/O event in the first file server.

16. The one or more non-transitory machine-readable media of claim 15, wherein the program code to intercept comprises program code to intercept with a filter in the first kernel space of the first file server.

17. The one or more non-transitory machine-readable media of claim 15, wherein the program code to send the file I/O event comprises program code to send the file I/O even to a socket in a second kernel space of the second file server.

* * * * *